(12) United States Patent
Katano et al.

(10) Patent No.: US 8,905,726 B2
(45) Date of Patent: Dec. 9, 2014

(54) FIXATION STRUCTURE FOR COMPRESSOR

(75) Inventors: Koji Katano, Toyota (JP); Yusuke Shimoyana, Kariya (JP); Masato Sowa, Kariya (JP)

(73) Assignees: Toyota Jidosha Kabushiki Kaisha, Toyota-Shi (JP); Kabushiki Kaisha Toyota Jidoshokki, Kariya-Shi (JP)

(*) Notice: Subject to any disclaimer, the term of this patent is extended or adjusted under 35 U.S.C. 154(b) by 650 days.

(21) Appl. No.: 12/810,479
(22) PCT Filed: Dec. 18, 2008
(86) PCT No.: PCT/JP2008/073062
§ 371 (c)(1),
(2), (4) Date: Jun. 24, 2010
(87) PCT Pub. No.: WO2009/084449
PCT Pub. Date: Jul. 9, 2009

(65) Prior Publication Data
US 2010/0278665 A1    Nov. 4, 2010

(30) Foreign Application Priority Data
Dec. 28, 2007   (JP) .................. 2007-339645

(51) Int. Cl.
*F04D 29/60* (2006.01)
*F04B 35/00* (2006.01)
*H01M 8/04* (2006.01)
*F04B 39/12* (2006.01)
*F04B 39/06* (2006.01)

(52) U.S. Cl.
CPC ...... *H01M 8/04089* (2013.01); *H01M 8/04007* (2013.01); *F04B 39/121* (2013.01); *H01M 8/04156* (2013.01); *F04B 39/06* (2013.01); *Y02E 60/50* (2013.01); *F04D 29/601* (2013.01)
USPC .......................... 417/360; 417/363; 429/400

(58) Field of Classification Search
USPC ............... 417/234, 360, 363, 410.1; 429/400
See application file for complete search history.

(56) References Cited

U.S. PATENT DOCUMENTS

| 7,162,797 B2 * | 1/2007 | Sowa et al. ............. 29/888.022 |
| 2004/0185316 A1 * | 9/2004 | Wells et al. .................... 429/22 |
| 2005/0005887 A1 | 1/2005 | Kinugawa et al. |

FOREIGN PATENT DOCUMENTS

| JP | 63-280888 A | 11/1988 |
| JP | 09-119394 A | 5/1997 |
| JP | 11-148482 A | 6/1999 |
| JP | 2004-162671 A | 6/2004 |
| JP | 2005-002969 A | 1/2005 |
| JP | 2005-44665 A | 2/2005 |
| JP | 2006-170139 A | 6/2006 |

(Continued)

*Primary Examiner* — Peter J Bertheaud
(74) *Attorney, Agent, or Firm* — Kenyon & Kenyon LLP

(57) ABSTRACT

Provided is a compressor fixation structure that can reduce the occurrence of condensation. In a fixation structure for a compressor that has an electric motor and a compression mechanism provided adjacently to the electric motor and driven by the electric motor, when forming a motor housing for the electric motor and a compression mechanism housing for the compression mechanism separately from each other, a fixation part to be fixed to an object to which the compressor is to be attached is provided in the compression mechanism housing. Consequently, the compression mechanism housing is integrated with the object, and the heat capacity of the compression mechanism including the compression mechanism housing can be assumed to be a larger capacity which includes the heat capacity of the object.

5 Claims, 4 Drawing Sheets

(56) References Cited

FOREIGN PATENT DOCUMENTS

| JP | 2006-318819 A | 11/2006 |
| JP | 2007-052948 A | 3/2007 |
| JP | 2007-192158 A | 8/2007 |
| JP | 2007-198187 A | 8/2007 |

\* cited by examiner

FIXATION STRUCTURE FOR COMPRESSOR

This is a 371 national phase application of PCT/JP2008/073062 filed 18 Dec 2008, which claims priority to Japanese Patent Application No. 2007-339645 filed 28 Dec. 2007, the contents of which are incorporated herein by reference.

TECHNICAL FIELD

The present invention relates to a fixation structure for a compressor.

BACKGROUND ART

In recent years, fuel cell systems have been developed which have as an energy source a fuel cell that generates electric power through an electrochemical reaction between fuel gas and oxidant gas. This type of fuel cell system may be configured to return the fuel-off gas discharged from the fuel cell back to a fuel gas supply path for supplying fuel gas to the fuel cell, through a fuel-off gas circulation path, so that the fuel gas components contained in the fuel-off gas can effectively be utilized, the fuel-off gas circulation path being provided with a fuel-off gas circulation pump that takes in and discharges the fuel-off gas.

Meanwhile, the electrochemical reaction produces water on the cathode-side of the fuel cell, and the produced water flows through the electrolyte membrane toward the anode-side, resulting in the fuel-off gas containing water. Accordingly, a compressor is used as the above-described fuel-off gas circulation pump. The above compressor is configured to have an electric motor and a compression mechanism provided adjacently to the electric motor and driven by the electric motor, and in view of workability, etc., the compressor is fixed to an object to which the compressor is to be attached via a fixation part provided in the motor housing for the electric motor (see, for example, Patent Document 1).

Patent Document 1: Japanese laid-open patent publication No. 2004-162671

DISCLOSURE OF THE INVENTION

Problem to be Solved by the Invention

If fluids to be compressed by a compressor contain water as in the above-mentioned case, the water could affect the operation of the compression mechanism when condensation occurs and the resulting water freezes.

Accordingly, an object of the present invention is to provide a compressor fixation structure that can reduce the occurrence of condensation.

Means for Solving the Problem

A compressor fixation structure according to the present invention is a fixation structure for a compressor that has an electric motor and a compression mechanism provided adjacently to the electric motor and driven by the electric motor, wherein a motor housing for the electric motor and a compression mechanism housing for the compression mechanism are formed separately from each other, and a fixation part to be fixed to an object to which the compressor is to be attached is provided in the compression mechanism housing.

With the above configuration, since the fixation part to be fixed to an object to which the compressor is to be attached is provided in the compression mechanism housing, the compression mechanism housing is integrated with the object, and the heat capacity of the compression mechanism including the compression mechanism housing can be assumed to be a larger capacity which includes the heat capacity of the object. As a result, decreases in temperature can be reduced in the compression mechanism, and the occurrence of condensation can be reduced.

In the above, it is preferable that the object is an end plate of a fuel cell which is formed of a plurality of stacked cells that generate electric power through an electrochemical reaction between fuel gas and oxidant gas, the end plate being disposed at an end in the cell-stacking direction, and that the compressor is a fuel-off gas circulation pump for returning fuel-off gas discharged from the fuel cell to the fuel cell.

With the above configuration, the compression mechanism housing is integrated with the end plate of the fuel cell, and the occurrence of condensation in the compression mechanism can consequently be reduced due to a larger heat capacity. In addition, even if condensation occurs and the compression mechanism freezes, such freezing can quickly be solved upon activation due to the temperature increase in the fuel cell and the consequent heat transfer from the end plate. Accordingly, the start-up performance of the compressor at low temperature can be improved.

Also, if the compression mechanism housing has a plurality of the above-mentioned fixation parts, it is preferable that a contact area enlargement part, which is to be in surface contact with the end plate, is provided between fixation surfaces of the fixation parts to be in surface contact with the end plate.

With the above configuration, the area of contact between the compression mechanism housing and the end plate can be increased by the contact area enlargement part between the fixation surfaces, and as a result, decreases in temperature can further be reduced in the compression mechanism. Furthermore, since the rigidity of the end plate can be enhanced by the compression mechanism housing due to the increased contact area, even if an external force is applied such that the end plate would suffer warping, the compression mechanism housing adhesion can be maintained against such warping.

Also, it is preferable that the material for the compression mechanism housing and the material for the motor housing are determined so that the compression mechanism housing has higher rigidity than the motor housing.

The compressor may be, for example, a compressor for a gas-liquid two-phase fluid.

Effect of the Invention

The compressor fixation structure of the present invention can reduce the occurrence of condensation.

DESCRIPTION OF REFERENCE NUMERALS

9: End plate (object to which a compressor is to be attached), 20: Fuel cell, 80: Electric motor, 81: Compression mechanism, 81: Motor housing, 91: Compression mechanism housing, 94: Fixation part, 94a: Fixation surface, 96: Joint part (contact area enlargement part), and H50: Hydrogen pump (compressor, fuel-off gas circulation pump).

BEST MODE FOR CARRYING OUT THE INVENTION

First, the entire configuration of a fuel cell system will be described in which an embodiment of the compressor fixation structure according to the present invention is utilized in a fuel cell. While the above fuel cell system is an on-vehicle power generation system for a fuel cell vehicle, other than fuel cell systems for vehicles, the present invention may also be utilized in fuel cell systems for various mobile objects including ships, airplanes, trains, walking robots, etc., and may also be utilized in, for example, fixed fuel cell systems in which fuel cells are used as power generation equipment for structures (houses, buildings, etc.).

Figure 1:
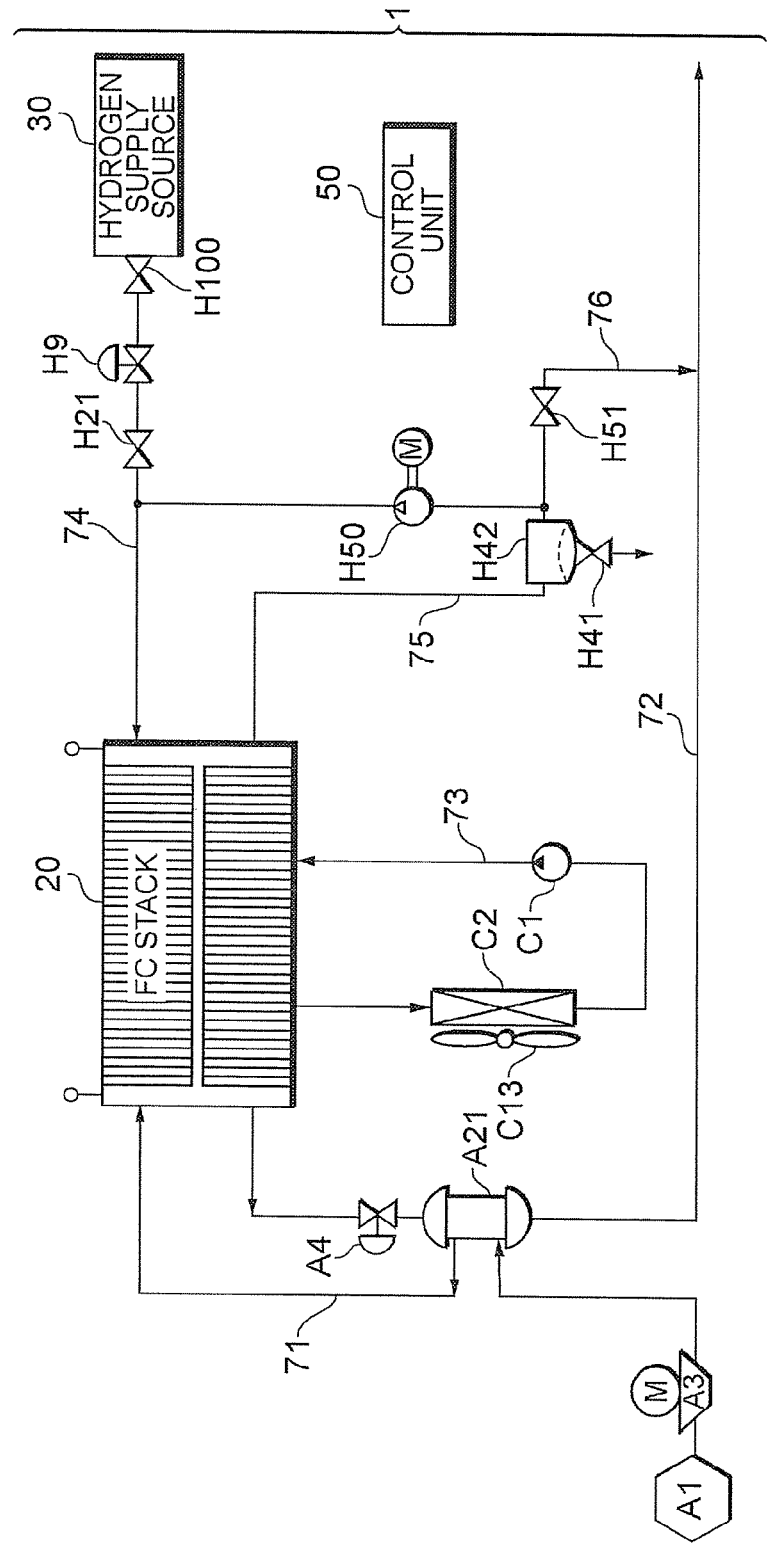
FIG. 1 is a system configuration diagram illustrating the entire configuration of a fuel cell system employing an embodiment of the compressor fixation structure according to the invention.

In a fuel cell system 1 illustrated in FIG. 1, air which serves as oxidant gas is supplied to an air supply port of a fuel cell 20 via an air supply path 71. The air supply path 71 is provided with an air filter A1 that removes fine particles from the air, a compressor A3 that pressurizes the air, and a humidifier A21 that humidifies the air as required. The air filter A1 has an air flow meter (flow meter), not shown in the drawing, for detecting the air flow rate. The compressor A3 is driven by a motor. The motor is controlled and driven by a control unit 50, which will be explained later.

The air-off gas discharged from the fuel cell 20 is released to the outside through an exhaust path 72. The exhaust path 72 is provided with a pressure regulating valve A4 and the humidifier A21. The pressure regulating valve A4 functions as a pressure regulator (pressure reducer) that sets the pressure of air to be supplied to the fuel cell 20. The control unit 50 regulates the number of revolutions of the motor that drives the compressor A3 and the degree/area of opening of the pressure regulating valve A4, thereby setting the pressure and flow rate of air to be supplied to the fuel cell 20.

Hydrogen gas which serves as fuel gas is supplied from a hydrogen supply source 30 to a hydrogen supply port of the fuel cell 20 through a hydrogen supply path 74. The hydrogen supply source 30 may be, for example, a high-pressure tank of hydrogen, and may also be a so-called fuel reformer, a hydrogen-absorbing alloy, etc.

The hydrogen supply path 74 is provided with: a cutoff valve H100 that supplies hydrogen from the hydrogen supply source 30 or stops such supply; a hydrogen pressure regulating valve H9 that reduces and regulates the pressure of hydrogen gas to be supplied to the fuel cell 20; and a cutoff valve H21 that opens and closes the passage between the hydrogen supply port of the fuel cell 20 and the hydrogen supply path 74. As for the hydrogen pressure regulating valve H9, for example, a pressure regulating valve that reduces pressure mechanically may be used, and valves with a degree of opening that is linearly or continuously adjustable by a pulse motor may also be used.

The hydrogen gas not consumed in the fuel cell 20 is discharged, as hydrogen-off gas (fuel-off gas), to a hydrogen circulation path (fuel-off gas circulation path) 75, and then returned to the hydrogen supply path 74, downstream of the hydrogen pressure regulating valve H9 and the cutoff valve H21. The hydrogen circulation path 75 is provided with: a gas-liquid separator H42 that recovers water from the hydrogen-off gas; a drain valve H41 that collects the recovered product water outside of the hydrogen circulation path 75, for example, in a tank not shown in the drawing; and a hydrogen pump (fuel-off gas circulation pump) H50 that is a compressor pressurizing the hydrogen-off gas.

The cutoff valve H21 closes the anode side of the fuel cell 20. The operation of the hydrogen pump H50 is controlled by the control unit 50. The hydrogen-off gas joins the hydrogen gas in the hydrogen supply path 74, and is supplied to the fuel cell 20 and reused there. The cutoff valve H21 is driven by a signal from the control unit 50.

The hydrogen circulation path 75 is connected to the exhaust path 72 downstream of the humidifier A21, via a discharge control valve H51 through a purge flow path 76. The discharge control valve H51 is an electromagnetic cutoff valve, and when it operates in response to a command from the control unit 50, the hydrogen-off gas is discharged (purged) to the outside together with the air-off gas discharged from the fuel cell 20. By carrying out the above purging operation intermittently, cell voltage reduction due to an increase in the impurity concentration in the hydrogen gas can be prevented.

A cooling path 73 for circulating a cooling water is provided at a cooling water inlet and outlet of the fuel cell 20. The cooling path 73 is provided with a radiator (heat exchanger) C2 that dissipates the heat of the cooling water to the outside, and a pump C1 that pressurizes the cooling water and circulates it. The radiator C2 has a cooling fan C13 that is driven by a motor to rotate.

The fuel cell 20 is a polymer electrolyte type fuel cell, and configured as a fuel cell stack formed of a desired number of stacked unit cells, which are supplied with hydrogen gas and air and generate electric power through an electrochemical reaction. The electric power generated by the fuel cell 20 is supplied to a power control unit not shown in the drawing. The power control unit is provided with, for example, an inverter that supplies power to a drive motor for the vehicle, an inverter that supplies power to various auxiliary apparatuses such as a compressor motor and a hydrogen pump motor, and a DC-DC converter that charges a power storage means such as a secondary battery and supplies power from the above power storage means to motors.

The control unit 50 is constituted by a control computer system with known configurations including a CPU, ROM, RAM, HDD, I/O interface and display, and receives, although not shown in the drawing, a required load such as an acceleration signal from the vehicle and control information from the sensors (pressure sensor, temperature sensor, flow rate sensor, output current meter, output voltage meter, etc.) in the respective parts of the fuel cell system 1, thereby controlling the operation of the valves and motors in the respective parts of the system.

The humidifier A21 carries out water exchange between the air supplied from the compressor A3 to the fuel cell 20 through the air supply path 71 and the air-off gas discharged from the fuel cell 20 to the outside through the exhaust path 72, so as to humidify the air. The humidifier A21 has a humidifying module and a casing that houses the humidifying module.

Figure 2:
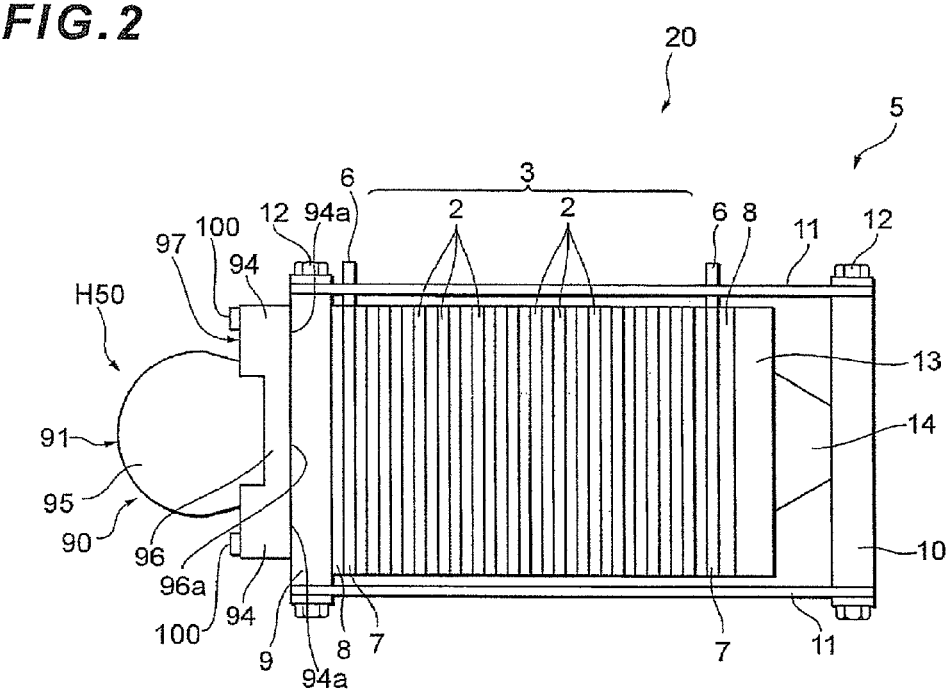
FIG. 2 is a side view of a fuel cell in the above fuel cell system.

As illustrated in FIG. 2, the fuel cell 20 has a stack body 3 formed of a plurality of stacked cells 2, which are basic units, and a frame 5 that supports the stack body 3. A terminal plate 7 is disposed in one end of the stack body 3 in the stacking direction of the cells 2, and an insulting plate 8 is disposed outside thereof. Disposed further outside thereof is an end plate 9, which constitutes the frame 5.

Also, a terminal plate 7 is disposed in the other end of the stack body 3, an insulating plate 8 is disposed outside thereof, and a pressure plate 13 is disposed further outside thereof. Each terminal plate 7 has an output terminal 6. Outside of the pressure plate 13, an end plate 10, which constitutes the frame 5, is disposed apart from the pressure plate 13, and a spring member 14 is provided between the pressure plate 13 and the end plate 10.

Several tension plates 11 are provided between the two end plates 9 and 10 disposed on both sides of the stack body 3, along the stacking direction of the cells 2. Both ends of each tension plate 11 are fixed respectively to the end plates 9 and 10 with bolts 12, and the tension plates 11 constitute the frame 5 together with the two end plates 9 and 10.

When connecting the two end plates 9 and 10 via the several tension plates 11, a compressive force is given to the spring member 14, so the spring member 14 applies an urging force to the stack body 3 in the stacking direction of the cells 2. The cells 2 are fastened to each other with that urging force. The reactive force created in response to the urging force of the spring member 14 is absorbed by the tension plates 11, resulting in a tension force acting on the tension plates 11.

The hydrogen pump H50 that is a compressor is attached to the outside of the end plate 9, which is one of the end plates of the fuel cell 20. In other words, the end plate 9 is the object to which the hydrogen pump H50 is attached.

Figure 3:
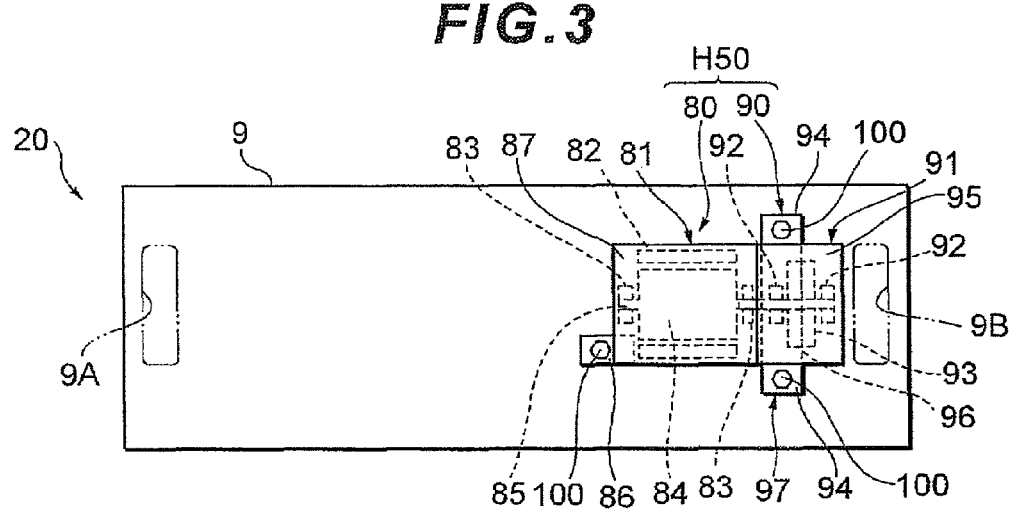
FIG. 3 is a front view of an embodiment of the compressor fixation structure according to the invention.

As illustrated in FIG. 3, the hydrogen pump H50 is a compressor having an electric motor 80 and a compression mechanism 90 provided integrally with and adjacently to the electric motor 80 and driven by the electric motor 80. For the hydrogen pump H50, for example, a compressor for a gas-liquid two-phase fluid may be employed, but the hydrogen pump H50 is not necessarily limited to that type of compressor.

The electric motor 80 has: a motor housing 81 that forms the outer part thereof; a stator 82 fixed to the interior of the motor housing 81; and a rotor 84 rotatably supported in the motor housing 81 via bearings 83. Here, the shaft 85 of the rotor 84 supported by the bearings 83, 83 is formed of a stainless steel material (SUS material) in view of strength and durability, etc., and the motor housing 81 is formed of, for example, aluminum alloy in view of formability and costs, etc.

The compression mechanism 90 has: a compression mechanism housing 91 that forms the outer part thereof; and an impeller 93 rotatably supported in the interior of the compression mechanism housing 91 via bearings 92. The compression mechanism housing 91 is formed separately from the motor housing 81 and fixed integrally to the motor housing 81.

The compression mechanism 90 is disposed to constitute a part of the hydrogen circulation path 75, and the impeller 93 is joined with the rotor 84 of the electric motor 80 and rotates synchronously with the rotor 84, thereby enabling the hydrogen-off gas to be taken in from the anode-side of the fuel cell 20 through the hydrogen circulation path 75, and compressed and discharged to the hydrogen supply path 74. Here, the compression mechanism housing 91, impeller 93 and bearings 92 are formed of the same stainless steel material (SUS material) in view of strength and durability, etc.

The compression mechanism housing 91 has, at an end thereof facing the electric motor 80, a plurality of fixation parts, more specifically, two fixation parts 94, 94 to be fixed to the end plate 9. As illustrated in FIG. 2, the fixation parts 94, 94 are formed to protrude from a housing body 95 that has a substantially bottomed cylindrical shape and houses therein the impeller 93, in the directions opposite to each other along substantially the same tangent line to the housing body 95, and a joint part (contact area enlargement part) 96 is formed between the fixation parts 94, 94 to join them on the same tangent line. In the compression mechanism housing 91, the above fixation parts 94, 94 and joint part 96 form an attachment foot part 97 to be attached to the end plate 9.

Figure 4:
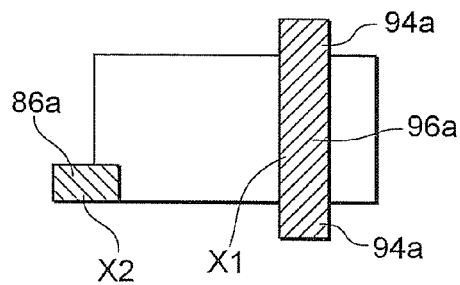
FIG. 4 is a diagram illustrating the areas in a motor housing and a compression mechanism housing, to be in contact with an end plate.

Accordingly, the joint part 96 has a contact face 96a to be in surface contact with the end plate 9, between a fixation surface 94a of one fixation part 94 to be in surface contact with the end plate 9 and a fixation surface 94a of the other fixation part 94 to be in surface contact with the end plate 9, and continuously to those fixation surfaces 94a, 94a. A bolt 100 is passed through each of the fixation parts 94, 94, and the compression mechanism housing 91 is fixed to the end plate 9 with the bolts 100. Note that the hatched area X1 shown in FIG. 4 is the area in the compression mechanism housing 91 shown in FIG. 3, to be in contact with the end plate 9.

As illustrated in FIG. 3, the motor housing 81 has, on the side opposite to the compression mechanism 90, just one fixation part 86 to be fixed to the end plate 9, i.e., a smaller number of fixation parts than the fixation parts 94, 94 of the compression mechanism housing 91. The fixation part 86 is formed to extend along the axial direction of a housing body 87 that has a substantially bottomed cylindrical shape and houses therein the stator 82, rotor 84, etc., from the area that overlaps the housing body 87 to the area that protrudes from the housing body 87 in the axial direction away from the compression mechanism 90.

A bolt 100 is also passed through the fixation part 86, and the motor housing 81 is fixed to the end plate 9 with this bolt 100. Note that the hatched area X2 shown in FIG. 4 is the area of the fixation surface 86a of the fixation part 86 in the motor housing 81 shown in FIG. 3, to be in contact with the end plate 9, and the area X2 in the motor housing 81 to be in contact with the end plate 9 is smaller than the area X1 in the compression mechanism housing 91 to be in contact with the end plate 9.

As already stated above, the material of the compression mechanism housing 91 is stainless steel, and the material of the motor housing 81 is aluminum alloy.

Here, a cooling water inlet 9A and cooling water outlet 9B of the above-described cooling path 73 are provided in the end plate 9 at the longitudinal ends thereof, and the hydrogen pump H50 is attached to the end plate 9 via the above-described two fixation parts 94, 94 of the compression mechanism housing 91 and one fixation part 86 of the motor housing 81, so that the hydrogen pump H50 is located, as a whole, in the cooling water outlet 9B side, and furthermore, the compression mechanism 90 is located close to the cooling water outlet 9B and the electric motor 80 is located on the side of the compression mechanism 90 opposite to the cooling water outlet 9B.

According to the above-described fixation structure for the hydrogen pump H50, since the fixation parts 94, 94 to be fixed to the end plate 9 are provided in the compression mechanism housing 91, the compression mechanism housing 91 is integrated with the end plate 9, and the heat capacity of the compression mechanism 90 including the compression mechanism housing 91 can be assumed to be a larger capacity which includes the heat capacity of the end plate 9. As a result, the compression mechanism 90 can be resistant to cooling, decreases in temperature can be reduced, and the occurrence of condensation can also be reduced.

Figure 5:
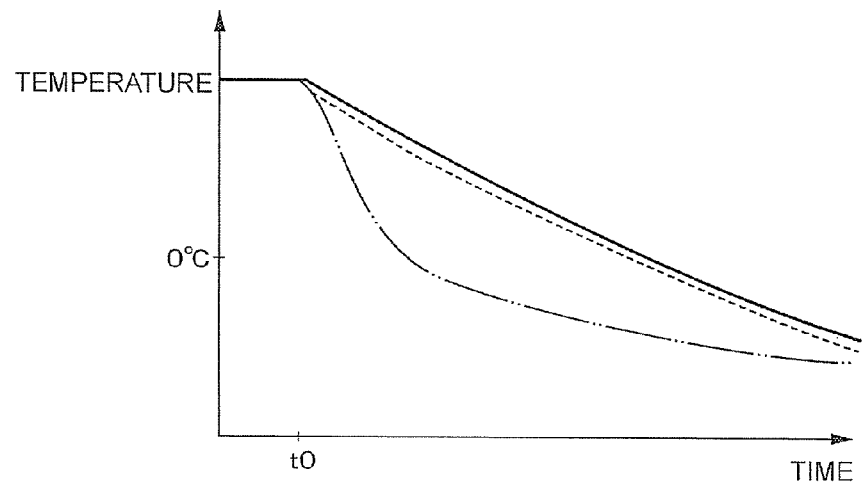
FIG. 5 is a characteristic chart showing a change in temperature, etc., in an embodiment of the compressor fixation structure according to the invention.

More specifically, after the time t0 when the fuel cell system 1 stops the operation, as shown by the dashed line in FIG. 5, the compression mechanism 90 of the hydrogen pump H50 exhibits a temperature decrease with a curve as slow as the end plate 9, which is shown by the solid line in FIG. 5, and condensation occurs first in the piping of the hydrogen circulation path 75 or in the gas-liquid separator H42, which have a small heat capacity and exhibit a temperature decrease with a sharp curve as shown by the dashed-double-dotted line in FIG. 5. As a result, the occurrence of condensation in the compression mechanism 90 of the hydrogen pump H50 can be reduced.

In addition, even if condensation occurs and results in the compression mechanism 90 freezing and the compression mechanism housing 91 and the impeller 93 adhering to each other, since the fixation parts 94, 94 are provided in the compression mechanism housing 91, upon activation of the system, such freezing of the compression mechanism 90 can quickly be solved by the temperature increase in the fuel cell 20 and the consequent heat transfer from the end plate 9. Accordingly, the start-up performance of the hydrogen pump H50 at low temperature can be improved.

Also, due to the joint part 96 between the fixation parts 94, 94 of the compression mechanism housing 91, the area of contact between the compression mechanism housing 91 and the end plate 9 can be increased, and accordingly, decreases in temperature in the compression mechanism 90 after the stop of the fuel cell system 1 operation can be further reduced, and the low-temperature startup performance can be further enhanced. Moreover, with the above increased contact area, the compression mechanism housing 91 serves as a reinforcing member to increase the rigidity of the end plate 9, and accordingly, if the end plate 9 suffers warping due to thermal stress, which would be generated because both ends are joined to the tension plates 11, the adhesion of the compression mechanism housing 91 can be maintained against such warping.

The invention claimed is:

1. A fixation structure for a compressor that has an electric motor and a compression mechanism provided adjacently to the electric motor and driven by the electric motor, wherein:
   a motor housing for the electric motor and a compression mechanism housing for the compression mechanism are formed separately from each other,
   a fixation part, which is between the compressor and an object to which the compressor is to be attached, wherein the fixation part is provided on an outer surface of the compression mechanism housing;
   the object is an end plate of a fuel cell which is formed of a plurality of stacked cells that generate electric power through an electrochemical reaction between fuel gas and oxidant gas, the end plate of the fuel cell being disposed at an end in the cell-stacking direction, and the compressor is a fuel-off gas circulation pump for returning fuel-off gas discharged from the fuel cell to the fuel cell; and
   the compression mechanism housing has a plurality of the fixation parts, and a contact area enlargement part, which is to be in surface contact with the end plate of the fuel cell, is provided between fixation surfaces of the fixation parts to be in surface contact with the end plate of the fuel cell,
   wherein the plurality of the fixation parts are disposed on a first side surface of the end plate, and the fuel cell is disposed on a second side surface of the end plate opposite to the first side surface, such that the end plate is positioned between, and is directly attached to the plurality of the fixation parts and the fuel cell, and
   wherein heat of the fuel cell is transferred from the end plate of the fuel cell to the compression mechanism housing.

2. The compressor fixation structure according to claim 1, wherein the compressor is a compressor for a gas-liquid two phase fluid.

3. A fixation structure for a compressor that has an electric motor and a compression mechanism provided adjacently to the electric motor and driven by the electric motor, wherein:
   a motor housing for the electric motor and a compression mechanism housing for the compression mechanism are formed separately from each other;
   a plurality of fixation parts to be fixed to an object to which the compressor is to be attached is provided in the compression mechanism housing;
   the object is an end plate of a fuel cell which is formed of a plurality of stacked cells that generate electric power through an electrochemical reaction between fuel gas and oxidant gas, the end plate being disposed at an end in the cell-stacking direction, and the compressor is a fuel-off gas circulation pump for returning fuel-off gas discharged from the fuel cell to the fuel cell; and
   materials for the compression mechanism housing and the motor housing are determined so that the compression mechanism housing has higher rigidity than the motor housing,
   wherein the plurality of the fixation parts are disposed on a first side surface of the end plate, and the fuel cell is disposed on a second side surface of the end plate opposite to the first side surface, such that the end plate is positioned between, and is directly attached to the plurality of the fixation parts and the fuel cell, and
   wherein heat of the fuel cell is transferred from the end plate to the compression mechanism housing.

4. The compressor fixation structure according to claim 3, wherein the compressor is a compressor for a gas-liquid two phase fluid.

5. A fixation structure for a compressor that has an electric motor and a compression mechanism provided adjacently to the electric motor and driven by the electric motor, wherein:
   a motor housing for the electric motor and a compression mechanism housing for the compression mechanism are formed separately from each other,
   a fixation part, which is between the compressor and an object to which the compressor is to be attached, wherein the fixation part is provided on an outer surface of the compression mechanism housing;
   the object is an end plate of a fuel cell which is formed of a plurality of stacked cells that generate electric power through an electrochemical reaction between fuel gas and oxidant gas, the end plate of the fuel cell being disposed at an end in the cell-stacking direction, and the compressor is a fuel-off gas circulation pump for returning fuel-off gas discharged from the fuel cell to the fuel cell; and
   the compression mechanism housing has a plurality of the fixation parts, and a contact area enlargement part, which is to be in surface contact with the end plate of the fuel cell, is provided between fixation surfaces of the fixation parts to be in surface contact with the end plate of the fuel cell,
   wherein the plurality of the fixation parts are disposed on a first side surface of the end plate, and the fuel cell is disposed on a second side surface of the end plate opposite to the first side surface, such that the end plate is positioned between, and is directly attached to, the plurality of the fixation parts and the fuel cell,
   wherein two fixation parts are formed to protrude from the motor housing in directions opposite to each other and intersecting with the axial direction of the motor housing, and a joint part is formed between the fixation parts to join them, and
wherein heat of the fuel cell is transferred from the end plate of the fuel cell to the compression mechanism housing.

* * * * *